March 11, 1930.  H. N. PUTNAM  1,750,491

WALL CONDUIT

Filed Aug. 15, 1927

INVENTOR
H. N. Putnam
BY Evans & McCoy
ATTORNEYS

Patented Mar. 11, 1930

1,750,491

UNITED STATES PATENT OFFICE

HERBERT N. PUTNAM, OF LAKEWOOD, OHIO

WALL CONDUIT

Application filed August 15, 1927. Serial No. 212,919.

The present invention relates to wall conduits of the type disclosed in my copending application Serial No. 191, 565, filed May 16, 1927, and has for an object to provide means for continuing the conduit around wall openings such as door or window openings.

A further object is to provide a structure in which the offset portion of the conduit around the opening is enclosed within a wooden or metal frame.

A further object is to provide a metal conduit structure for partition walls which forms a base upon which the wall is built and by means of which the opposite faces of the wall are aligned.

Further objects are to so construct the conduit around the margin of the opening as to provide plaster grounds and also to provide the conduit with means for supporting nailing grounds to which the frame trim may be secured.

With the above and other objects in view, the invention may be said to comprise the structure as illustrated in the accompanying drawings hereinafter described and particularly set forth in the appended claims, together with such variations and modifications thereof, as will be apparent to one skilled in the art to which the invention appertains.

Reference should be had to the accompanying drawings forming a part of this specification in which.

Figure 1:
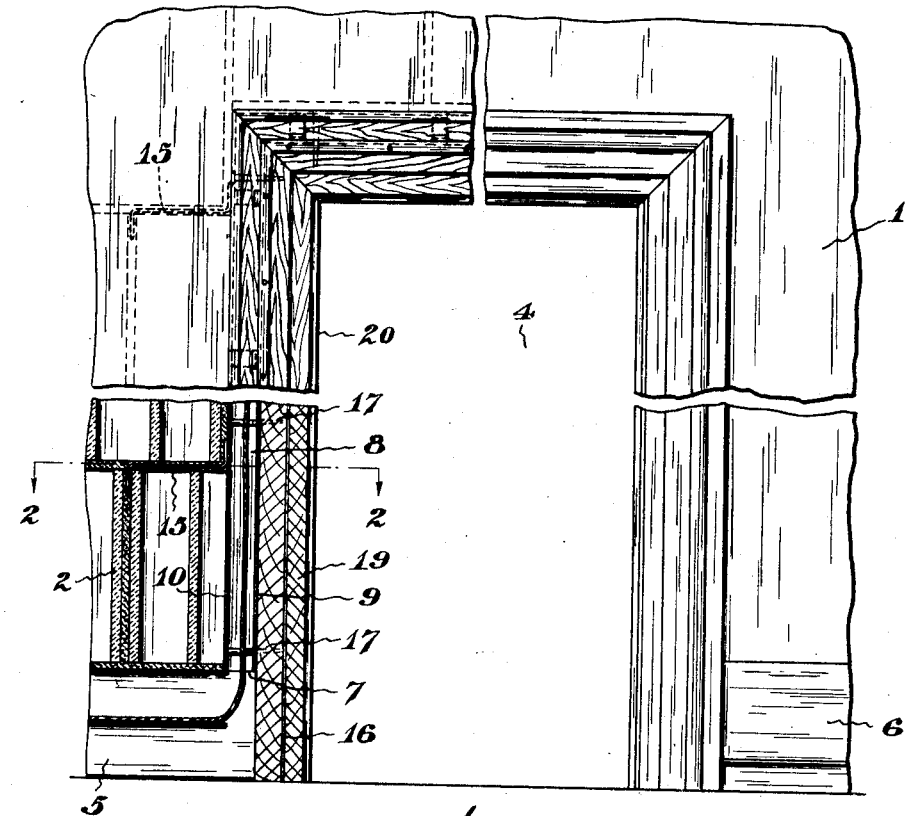
Fig. 1 is a side elevation of a wall having a door opening about which the conduit extends, the door frame at the lower left hand portion thereof being broken away to show the conduit in section on the line indicated at 1—1 in Fig. 2, the upper left hand portion of the frame being broken away to the line indicated at 1ª—1ª in Fig. 2 to show the nailing grounds carried by the conduit.
Figure 2:
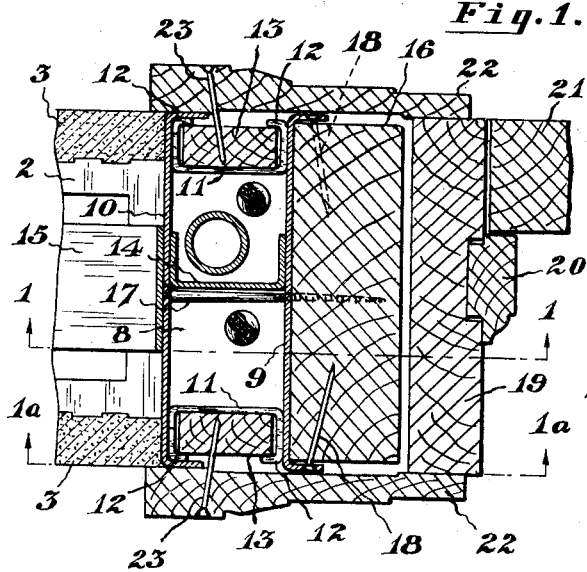
Fig. 2 is a horizontal section taken on the line indicated at 2—2 in Fig. 1.

The invention is illustrated in the accompanying drawings and will be hereinafter described as applied to a door opening, but it is to be understood that it is immaterial in so far as the invention is concerned, whether the opening in the wall be a door opening, a window opening or other opening in the wall of the building.

In the drawings, a fragmentary portion only of the wall is shown and this is designated by the reference numeral 1. The body of the wall may be of any suitable material, such as wood, metal, tile, etc. As shown in the drawings, the wall is formed of hollow tile 2 and the opposite faces covered with a coat of plaster 3, as is common practice in wall construction. A door opening 4 is shown in the wall and, extending laterally from opposite sides of the door opening, are the main sections 5 of a built-in conduit for electrical wiring and for water and other pipes, access being obtained to the conduit through a removable base plate 6 as more fully shown in my copending application above referred to.

The conduit is built into the wall and is formed of structural members that support superimposed portions of the wall. Adjacent the opening 4, the top members of the conduit sections 5 terminate short of the ends of the section to provide an opening 7 through the top which communicates with a conduit 8, which forms a continuation of the main conduit around the door opening.

The conduit 8 consists of inner and outer channel members 9 and 10, both of which face inwardly, and opposite side members 11 in the form of outwardly facing channels secured between the inner and outer channels 9 and 10. The side members 11 may be continuous or interrupted channel sections, as desired, and the flanges of the side members have inturned edge portions 12 to retain nailing grounds 13 which may be in the form of continuous wood strips or in the form of blocks, as desired. The width or spacing of the flanges of the channels 9 and 10 corresponds to the thickness of the wall and the outer channel 10 projects beyond opposite faces of the tiles 2 of the wall to form grounds for the plaster 3. The conduit 8 as well as the main conduit sections 5 are reinforced and divided into separate compartments, which communicate with corresponding compartments in the main sections 5 of the conduit, by means of a central channel shaped partition member 14 secured between the inner and outer members 9 and 10. The sections of the conduit 8 at opposite sides of the door opening are joined to a similar section extending across the top of the door opening to provide a continuous conduit around the opening.

Conduit 8 may be anchored to the adjoining portions of the wall by metal ties 15, secured thereto and cemented to the joints between superimposed tiles. In the completed wall a buck 16 is positioned in the inwardly facing channel of the inner member 9 of the conduit, and the conduit and buck may be joined by means of screw 17 extending through the conduit and nails 18 driven through the flanges of the member 9. Upon the inner face of the buck there are secured frame members 19, provided with door stops 20 against which a door 21 engages when in closed position. The door frame is also provided with removable trims 22 overlying opposite faces of the wall and covering opposite sides of the conduit member 8 and buck 16, the trim being secured in place by nails 23 extending into the grounds 13 in the side channels 11 of the conduit.

Figure 3:
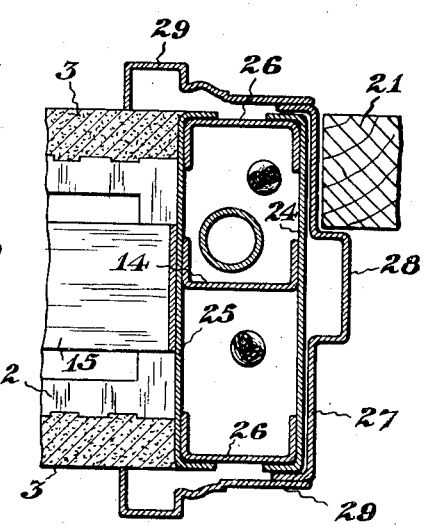
Fig. 3 is a sectional view similar to Fig. 2 showing a modified construction in which the conduit is enclosed within a metal door frame.

In Fig. 3, a modified construction is shown in which conduit is formed of inner and outer channels 24 and 25 and side channels 26, which may be continuous or interrupted and secured between the channels 24 and 25. In this modification, the channel 25 corresponds to the channel 10 in the modification first described, but the channel 24 faces outwardly and channels 26 face inwardly, forming a substantially rectangular enclosed conduit. The conduit conforms to the metal frame 27, which is provided with a door stop 28 and with trims 29 extending along the opposite faces of the wall past the sides of the conduit to conceal the same. The trims 29 may be made removable, if desired, to give access to the conduit.

An important feature of the invention is the provision of a conduit construction for partition structures which forms an aligning base which can be accurately secured in place upon the floor and upon which the wall may be built with its opposite faces accurately aligned with the opposite sides of the conduit, the plaster grounds at the opposite sides of the conduit providing means for accurately aligning the wall faces. The bucks 16 which may be set up prior to the conduit sections 8 are preferably of a width somewhat less than the space between the flanges of the channel 9 so that the sections 8 may be positioned plumb and in proper alignment with the main conduit sections 5 regardless of any slight inaccuracies in the setting of the bucks 16.

It will be apparent that the present invention not only provides an easily accessible conduit for wiring or piping, but also provides a conduit which is an integral part of the wall without unsightly projections and which, in addition, greatly facilitates the erection of the wall.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A wall structure having an opening therein and a tubular conduit built into the wall and composed of metallic structural members forming wall supports, said conduit extending laterally from opposite sides of the opening and along the margin of the opening around one end thereof.

2. A wall structure having an opening therein, a tubular conduit built into the wall and composed of structural members forming wall supports, said conduit extending from opposite sides of the opening and along the margin of the opening around one end thereof and a frame enclosing the portion of the conduit extending along the margin of the opening.

3. A wall structure having an opening therein and a built-in conduit of a width corresponding to the thickness of the wall, one side of said conduit being substantially flush with one face of the wall and the opposite side of the conduit being substantially flush with the opposite face of the wall, said conduit extending laterally from opposite sides of the opening and along the margin of said opening around one end thereof.

4. A wall structure having an opening therein, a tubular conduit built into the wall and composed of structural members forming wall supports, said conduit extending from opposite sides of the opening and along the margin of the opening around one end thereof, and a frame for a closure member having a trim covering the portion of the conduit extending along the margin of the opening.

5. In a wall having an opening therein, tubular members substantially rectangular in cross section abutting the edges of the wall along opposite sides and along one end of the opening, said members being of a width substantially equal to the thickness of the wall and having central partition members extending lengthwise thereof to provide a pair of conduits around said opening.

6. A wall having a door opening, a tubular member rectangular in cross section forming a conduit along the side and top edges of the opening, a buck mounted in the opening contiguous to the inner faces of said members, door frame members within the buck, and a trim on each face of the wall overlying said conduit buck and frame members.

7. In a wall having an opening therein, tubular members rectangular in cross section abutting the edges of the wall along opposite sides and along one end of the opening, said members being of a width substantially equal to the thickness of the wall, a buck secured to the inner faces of said members, frame members within the buck, nailing grounds carried by said tubular members, and a trim on each face of the wall overlying said conduit, buck and frame members and secured to said grounds.

8. A wall having a door opening and a metal conduit of a width substantially equal to the thickness of the wall extending along the floor and along the side and top edges of the door opening, said conduit forming an aligning base for said wall.

9. In a wall having an opening therein, a metal conduit in the wall of a width substantially equal to the thickness of the wall and extending laterally from opposite sides of the opening and along the margin of the opening around one end thereof, said conduit having portions at the opposite sides thereof forming plaster grounds.

10. In a wall having an opening therein, a metal conduit in the wall of a width substantially equal to the thickness of the wall and extending laterally from opposite sides of the opening and along the margin of the opening around one end thereof, and a frame enclosing the conduit along the margin of the opening, said frame being removable to give access to the conduit.

In testimony whereof I affix my signature.

HERBERT N. PUTNAM.